March 17, 1959
V. R. BRIGGS
2,877,949
MICROSYN TORQUE BALANCE COMPUTER
Filed Aug. 18, 1954
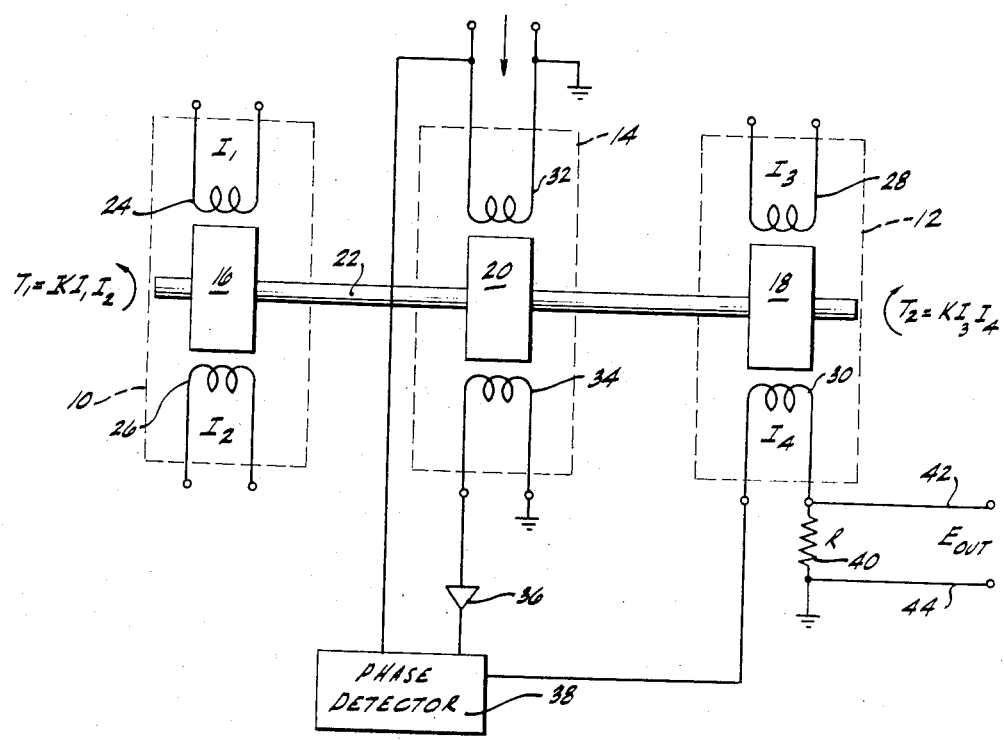
INVENTOR.
VERNON R. BRIGGS,
BY
Henry Heyman
ATTORNEY.

of Delaware
United States Patent Office 2,877,949
Patented Mar. 17, 1959

2,877,949

MICROSYN TORQUE BALANCE COMPUTER

Vernon R. Briggs, Los Angeles, Calif., assignor to Hughes Aircraft Company, Culver City, Calif., a corporation of Delaware Application August 18, 1954, Serial No. 450,581

7 Claims. (Cl. 235—61)

This invention relates generally to electro-mechanical computers and more particularly to an electro-mechanical analog computing device using the torque balance principle.

More specifically, this invention relates to an electro-mechanical analog computer of the type wherein the principle of torque balance is utilized. Such a computer as presently known employs a lever member which is balanced on a fulcrum by means of currents applied to coils supported by the lever. When the lever is not in a null position, its movement is converted into an electric signal, in response to which a current is applied to one of the coils to effect a counter-torque which restores the lever to its null position. Such a computer device is described in the publication, "Specialties Automatic Current Balance," Specialties, Inc., Syosset, Long Island, N. Y., May 11, 1949.

It is an object of this invention to provide an efficient electro-mechanical analog computer which does not employ long levered members and which is more compact, smaller in size, and more reliable than such computers of the prior art.

It is another object of this invention to provide an electro-mechanical analog computer which employs a minimum number of component parts of simple design and rugged mechanical construction, capable of highly efficient operation over a long operating life.

In accordance with this invention, first and second double wound microsyn torque generators and one microsyn signal generator have their rotors mounted on a common shaft. Respective input signals are applied to both windings of the first torque generator and one winding of the second torque generator. An A.-C. excitation signal is applied to the primary winding of the signal generator. The remaining winding of the second torque generator is coupled to the secondary winding of the signal generator through an amplifier and a phase detector. Torque created by the input signals applied to the windings of the first torque generator results in angular displacement of the rotor which in turn produces an A.-C. output signal proportional to the angular displacement from the signal generator. The A.-C. output signal, after being converted to a D.-C. output signal by the phase detector is fed to the winding of the second torque generator to exert, in combination with a signal in its other winding, a counter-torque on the shaft. The signal from the secondary of the signal generator, which is fed to the one winding of the torque generator, is a computed analog signal which bears a desired functional relation to the input signals.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. The scope of the invention is pointed out in the appended claims.

Referring to the single figure of the drawing, which is made part of this specification, an electro-mechanical computer in accordance with this invention employs two microsyn torque generators and a microsyn signal generator. Microsyns are described in the publication, "Electronic Instruments," M. I. T. Radiation Laboratory Series, vol. 21, chapter 12, pages 364–367 (McGraw-Hill Book Company, New York, New York, 1948). As disclosed in such publication, a microsyn is a device having a two-pole rotor and a four-pole stator, with coils placed on each stator pole. The coils can be connected to provide two windings, and the coil connections may be so made as to provide an alternating current signal generator, to obtain an A.-C. voltage which varies linearly in amplitude with the angular rotation of the rotor from a null or initial position. The coil connections may also be made to provide a torque generator, to produce a torque output which is proportional to the square of an input current or to the product of the currents in two exciting windings, but which is essentially constant over a reasonably large rotation of the rotor. The torque generator will work on either direct or alternating current input signals.

As illustrated, the single figure shows two microsyn torque generators 10 and 12, and a microsyn signal generator 14. The rotors 16, 18, and 20 of the respective torque generators 10, 12 and signal generator 14 are rigidly mounted on the same shaft 22.

The characteristic of each torque generator is that its rotor is subjected to a torque which is proportional to the product of the current in its two windings. If the two torque generators are identical in all respects, the constant of proportionality will also be the same for both generators. Let the current passing through the windings 24, 26 of generator 10 and the windings 28, 30 of generator 12 be $I_1$, $I_2$, $I_3$, and $I_4$, respectively. Let $T_1$ and $T_2$ be the torque developed by torque generators 10 and 12, respectively. Therefore $$T_1 = K I_1 I_2$$
$$T_2 = K I_3 I_4$$

where K is the constant of proportionality. If the system is at rest, i. e. in balanced condition, $T_1$ must be equal to $T_2$ and, therefore, $I_1 I_2$ must be equal to $I_3 I_4$. This is the general equation for the system.

The signal generator does not develop a torque. One of its windings 32 is energized by an A.-C. excitation voltage. Variation in excitation voltage results in a change in loop gain but only a negligible change in the computer output if this loop gain is high. Its other winding 34 will provide an A.-C. output whose amplitude is proportional to the angular displacement of rotor 20 with respect to one relative position at which the output is zero. This one position can conveniently be referred to as the neutral position. The angular position of the rotor 20 will have the same magnitude of output for clockwise or anticlockwise angular displacement from the neutral position but will be 180° out of phase. To determine the direction of the angular displacement, an amplifier 36 is connected between the ungrounded end of winding 34 and a phase detector 38. The ungrounded end of winding 32 is also connected to phase detector 38 which converts the A.-C. output signal to a D.-C. output signal. The D.-C. output signal is coupled to one end of winding 30 of generator 12. A load resistor 40 is connected between the other end of winding 30 and ground, and output circuit terminals 42, 44 are connected across resistor 40.

The operation and cooperation of the above described system will now be explained. If the system is initially in its neutral position, the signal generator 14 will have zero output and consequently current $I_4$ will be equal to zero. Assume that it is desired to obtain the product of two variable quantities. These quantities can be represented by currents $I_1$ and $I_2$ supplied to the armature windings 24 and 26. Torque generator 10 will produce a torque proportional to the product $I_1$ and $I_2$. This torque will result in angular displacement of rotor 16, and thereby of rotors 20 and 18, which are connected to one another by shaft 22. The angular displacement of rotor 20 will produce a signal from signal generator 14, the magnitude of which is proportional to this angular displacement and the phase of which indicates the direction of the angular displacement. A constant current $I_3$, which may be obtained from some suitable constant current source, may be supplied to armature winding 28.

The output of phase detector 38 is a current $I_4$. The current $I_4$ is in phase with the excitation signal for one direction of rotation of the shaft, and 180° out of phase with the excitation signal for the opposite direction of rotation. The direction of current $I_4$ in winding 30 is such that the torque generator 12 produces a torque $T_2$ proportional to the product of $I_3$ and $I_4$ in exact opposition to the torque $T_1$. At balance, the torque $T_2$ must be equal to the torque $T_1$ and the magnitude of the current $I_4$ necessary to produce the torque $T_2$ can be readily observed as a voltage drop across the resistor 40. The product of the two variable quantities $I_1$ and $I_2$ is now continuously computed by $$I_1 I_2 = \left(\frac{I_3}{R}\right) E_{out} = \text{Constant} \times E_{out}$$

where R is the resistance of resistor 40. Since R and $I_3$ are constant, $E_{out}$ is the desired product, which may be at a suitable scale.

If it is desired to obtain the ratio of two variable quantities, the same procedure can be adopted by connecting the variable quantities to windings 24 and 28 and providing a constant current $I_2$ to winding 26. In this case, the ratio of two variables $I_1$ to $I_3$ can be determined by the equation $$\frac{I_1}{I_3} = \frac{E_{out}}{I_2 R} = \text{Constant} \times E_{out}$$

The application of the above computer can, of course, be extended to three variable quantities if two quantities are to be multiplied and divided by the third. Also, this computer will readily lend itself to obtain the squares or square roots of one variable quantity by connecting two windings in parallel. Further, a great number of combinations can be achieved which not only provide computing of products of single numbers, but also the products and ratio of sums and differences of varying quantities.

As an example of the solution of a more complex problem, consider the equation $$x^2 - 2bx - a^2 = 0$$

This can be written as $$(x+a)(x-a) = 2bx$$

If armature winding 24 is provided with a current $(x-a)$, winding 26 with a current $(x+a)$, winding 28 carrying a current $2b$, then the current in winding 30 is the required solution of the equation, namely the quantity $x$.

The currents $(x+a)$ and $(x-a)$ can be provided by suitable interconnection of the windings of torque generator 10 with winding 30 so that the input quantity $a$ is added to one winding, for example the winding 24, and the negative of the input quantity, i. e., $-a$, is added to the other winding 26.

From the foregoing, it is clear that there has been described a novel analog computer with an electro-mechanical device utilizing the torque balance principle.

What is claimed is:

1. An analog computer comprising first and second microsyn torque generators, each of said torque generators having a pair of windings, a microsyn signal generator, said signal generator having a primary and secondary winding, a common shaft supporting said first and second torque generators and said signal generator, the windings of said first torque generator and one of the windings of said second torque generator being adapted to receive respective analog input signals, said primary winding being adapted to receive an excitation signal, the input signals of the windings of said first torque generator being effective to exert the torque to cause said shaft to rotate in one direction, the turning of said shaft causing a signal to be developed in said secondary winding which is proportional to the angular displacement of said shaft, the remaining winding of said second torque generator being coupled to said secondary winding for receiving a signal proportional to the output signal from said secondary winding, and the signals in the windings of said second torque generator combining to effect a counter torque which is equal and opposite to that effected by the signals applied to the windings of said first torque generator, and an output circuit coupled to said remaining winding of said second torque generator.

2. An analog computer comprising a first and a second microsyn torque generator and a microsyn signal generator, each of said torque generators having a rotor and a pair of windings, said signal generator having a rotor and a primary and a secondary winding, a common shaft supporting the rotors of all three microsyns, the windings of said first torque generator and one of the windings of said second torque generator being adapted to receive respective analog input signals, said primary winding being adapted to receive an excitation signal, the input signals of the windings of said first torque generator combining to produce a torque on said rotor to cause angular displacement of said shaft in one direction, the turning of said shaft causing the rotor of said signal generator to develop a signal in said secondary winding which is proportional to the angular displacement of said shaft, the remaining winding of said second torque generator being coupled to said secondary winding for receiving a signal proportional to the output signal from said secondary winding, and signals in the windings of said second torque generator combining to effect a torque which is equal and opposite to that produced by the signals applied to the windings of said first torque generator, and an output circuit coupled to said remaining winding of said second torque generator.

3. An analog computer comprising a first and second microsyn torque generator and a microsyn signal generator for continuously computing the expression $$\frac{I_1 \times I_2}{I_3}$$

each of said torque generators having a rotor and a pair of windings, said signal generator having a rotor and a primary and a secondary winding, a common shaft coupling the rotors of all three microsyns, the windings of said first torque generator and one of the windings of the second torque generator being adapted to receive the input signals $I_1$, $I_2$, and $I_3$, respectively, said primary winding being adapted to receive an excitation signal, said first torque generator being responsive to the input signals $I_1$ and $I_2$ to produce a torque on said rotor proportional to the product of $I_1$ and $I_2$ and causing angular displacement of said shaft in one direction, the turning of said shaft causing the rotor of said signal generator to set up an effective magnetic flux through said secondary winding and causing a signal to be developed therein which is proportional to the angular displacement of said shaft, the remaining winding of said second torque generator being coupled to said secondary winding for receiving a signal $I_4$ proportional to the output signal of said secondary winding, and said second torque generator being operative in response to the signals $I_3$ and $I_4$ to effect a torque which is equal and opposite to that produced by signals $I_1$, $I_2$ applied to the windings of said first torque generator, so that $I_4$ is equal to $$\frac{I_1 \times I_2}{I_3}$$

and an output circuit coupled to said remaining winding of said second torque generator to receive the signal $I_4$.

4. The device of claim 2 where $I_1$ is constant, whereby $I_4$ represents the quotient $$\frac{I_2}{I_3}$$

5. The device of claim 2 where $I_2$ is an unvaried, known signal so that the computer computes a quotient $$\frac{I_1}{I_3}$$

6. The device of claim 2 where $I_3$ is an unvaried, known signal so that the computer computes the product $I_1 \times I_2$.

7. An analog computer comprising a first and a second microsyn torque generator and a microsyn signal generator, said microsyns being of the type having identical rotors and stators, said torque generators having an identical pair of windings, said signal generator having a primary and a secondary winding, a common shaft coupling the rotors of all three microsyns, the windings of said first torque generator and one of the windings of said second torque generator being adapted to receive respective analog input signals, said primary winding being adapted to receive an excitation signal, the input signals of the windings of the first torque generator combining to produce a torque on said rotor, causing angular displacement of said shaft in one direction, the turning of said shaft causing the rotor to said signal generator to set up an effective alternating magnetic flux through said second winding causing a signal to be developed therein whose amplitude is proportional to the angular displacement of said shaft, and whose phase is dependent on the direction of the angular displacement, a phase detector for determining the phase shift between the input to a said primary and the output from said secondary winding, said phase detector being adapted to receive signals from said primary and said secondary winding, the remaining winding of said torque generator being adapted to receive a signal from said phase detector, and signals in the windings of said second torque generator combining to effect a torque which is equal and opposite to that produced by the signals applied to the windings of said first torque generator, an output circuit coupled to said remaining winding of said second torque generator.

References Cited in the file of this patent
UNITED STATES PATENTS 1,907,804    Hausman  ---------------- May 9, 1933
2,535,250    Allen  ------------------ Dec. 26, 1950

OTHER REFERENCES

Electronic Instruments (Greenwood et al.), 1948, pages 365 and 366.

Electronic Analog Computers (Korn & Korn), 1952, pages 217 and 218.

Proceedings of Electronic Computer Symposium (Dorsey), April 1952, pages V–1–V–7.